(12) United States Patent
Chen et al.

(10) Patent No.: US 9,836,112 B2
(45) Date of Patent: Dec. 5, 2017

(54) PORTABLE DEVICE AND METHOD FOR ENABLING THE SAME

(71) Applicant: Wistron Corp., New Taipei (TW)

(72) Inventors: Tsung Yuan Chen, New Taipei (TW); Yung-Yen Chang, New Taipei (TW)

(73) Assignee: WISTRON CORP., New Taipei (TW)

( * ) Notice: Subject to any disclaimer, the term of this patent is extended or adjusted under 35 U.S.C. 154(b) by 272 days.

(21) Appl. No.: 14/259,966

(22) Filed: Apr. 23, 2014

(65) Prior Publication Data

US 2015/0153795 A1 Jun. 4, 2015

(30) Foreign Application Priority Data

Dec. 4, 2013 (TW) .............................. 102144427 A

(51) Int. Cl.
*G06F 1/32* (2006.01)
*G06F 9/44* (2006.01)

(52) U.S. Cl.
CPC .......... *G06F 1/3215* (2013.01); *G06F 9/4406* (2013.01)

(58) Field of Classification Search
None
See application file for complete search history.

(56) References Cited

U.S. PATENT DOCUMENTS

| | | | | |
|---|---|---|---|---|
| 5,313,639 A | * | 5/1994 | Chao ...................... | G06F 21/34 340/5.54 |
| 5,537,544 A | * | 7/1996 | Morisawa ............... | G06F 21/31 713/183 |
| 7,593,000 B1 | * | 9/2009 | Chin ....................... | G06F 21/32 345/156 |
| 7,783,281 B1 | * | 8/2010 | Cook ...................... | G06F 21/88 455/410 |
| 8,209,637 B2 | * | 6/2012 | Chaudhri ............ | G06F 3/04883 345/156 |

(Continued)

FOREIGN PATENT DOCUMENTS

CN 1673923 A 9/2005
CN 101697181 A 4/2010

(Continued)

OTHER PUBLICATIONS

CN Office Action dated Apr. 28, 2017 as received in Application No. 201310703662.0 (English Translation).

*Primary Examiner* — Paul J Yen
(74) *Attorney, Agent, or Firm* — Maschoff Brennan

(57) ABSTRACT

A portable device and a method for enabling the portable device are disclosed. The portable device comprises a power module, a processing module, a sensing module, and an enable control module. The power module is configured to provide electric power. The processing module is configured to run an operating system to drive the portable device when the processing module itself is enabled. The sensing module is configured to sense a gesture to generate a group of touch sensing signals, and to judge whether the group of touch sensing signals conform to a group of predefined signals so as to generate an operating system enabling signal. The enable control module is configured to temporarily enable the sensing module according to a switching signal, and to enable the processing module according to the operating system enabling signal.

26 Claims, 8 Drawing Sheets

(56) References Cited

U.S. PATENT DOCUMENTS

| | | | |
|---|---|---|---|
| 8,650,636 B2* | 2/2014 | Johnson | H04L 9/3226 705/51 |
| 2005/0257050 A1* | 11/2005 | Gierens | G06F 21/31 713/165 |
| 2007/0150842 A1 | 6/2007 | Chaudhri et al. | |
| 2008/0034241 A1* | 2/2008 | Juan | G06F 1/263 713/323 |
| 2012/0127098 A1* | 5/2012 | Lazaridis | G06F 3/0416 345/173 |

FOREIGN PATENT DOCUMENTS

| | | |
|---|---|---|
| CN | 102043433 A | 5/2011 |
| CN | 102109945 A | 6/2011 |
| CN | 102681785 A | 9/2012 |

* cited by examiner

PORTABLE DEVICE AND METHOD FOR ENABLING THE SAME

CROSS REFERENCE

The present application is based on, and claims priority from, Taiwan Application Serial Number 102,144,427, filed on Dec. 4, 2013, the disclosure of which is hereby incorporated by reference herein in its entirety.

BACKGROUND

Field

The present invention generally relates to a portable device and a method for enabling the same, and particularly to a portable device with touch pad and a method for enabling the same.

Related Art

Mobile devices with touch screens are featured prominently in the current mobile communication technology. Such a device, once turned on, may be configured to receive a security code or predefined gesture from its user through the touch screen in order to be operational. A design of this kind, however, is not without pitfall. If the user, having shut off the device and put it in a purse or pocket, inadvertently and unknowingly turned it on when its power button was pressed, the device would be kept waiting for the input, wasting and even depleting its electrical supply until it is noticed by the user.

SUMMARY OF THE INVENTION

In one or more exemplary embodiments of this invention, a portable device may comprise a power module, a processing module, a sensing module, and an enabling control module. The power module is configured to provide electric power. The processing module is electrically coupled to the power module and configured to perform an operating system to drive the portable device when being enabled. The sensing module is configured to sense a gesture to generate a set of touch sensing signals when being enabled and to generate an operating system start-up signal when the set of touch sensing signals conforms to a set of preset signals. The enabling control module is electrically coupled to the sensing module, the power module, and the processing module, and is configured to conduct a first power path between the power module and the sensing module according to a switching signal to enable the sensing module and to conduct a second power path between the power module and the processing module to enable the processing module when receiving the operating system start-up signal.

In one or more exemplary embodiments of this invention, a method for enabling a portable device may comprise the steps of: generating a first enabling signal according to a switching signal to enable a sensing module, sensing a gesture by the sensing module to obtain a set of touch sensing signals corresponding to the gesture, generating an operating system start-up signal by determining whether the set of touch sensing signals conforms to a set of preset signals, and generating a second enabling signal according to the operating system start-up signal to enable a processing module to perform an operating system to drive the portable device.

In one or more exemplary embodiments of this invention, a portable device may comprise a power module, a processing module, a sensing module, and an enabling control module. The power module is configured to provide electric power. The processing module is electrically coupled to the power module and configured to perform an operating system to drive the portable device when being enabled. The sensing module is configured to sense a gesture to generate a set of touch sensing signals when being enabled. The enabling control module is electrically coupled to the sensing module, the power module, and the processing module, and is configured to conduct a first power path between the power module and the sensing module according to a switching signal to enable the sensing module, and to determine whether the set of touch sensing signals conforms to a set of preset signals so as to correspondingly generate an operating system start-up signal and conduct a second power path between the power module and the processing module according to the operating system start-up signal to enable the processing module to perform the operating system.

In order to make the aforementioned and other features of the present invention more comprehensible, several embodiments accompanied with figures are described in detail below.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1A:
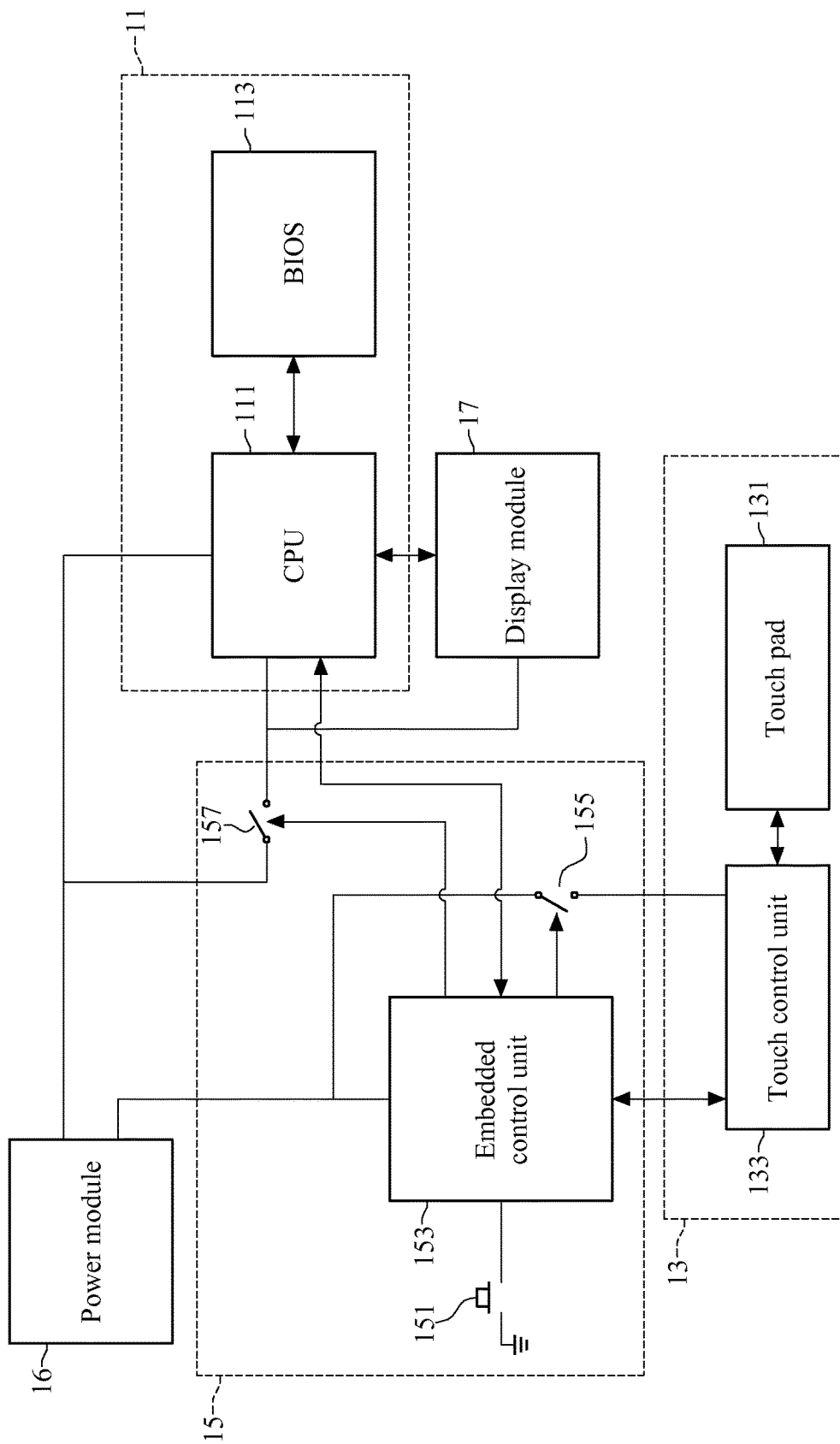
FIG. 1A is a functional block diagram of the portable device according to one embodiment of this invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A portable device is provided in this invention. The provided device may get rid of wasting electric power by being powered on by unaware touching. The portable device in this invention may be a smart phone, a tablet computer, or any other portable electronic device capable of reading the input via the touch panel. The aforementioned devices are not to limit the scope of this invention.

Figure 1B:
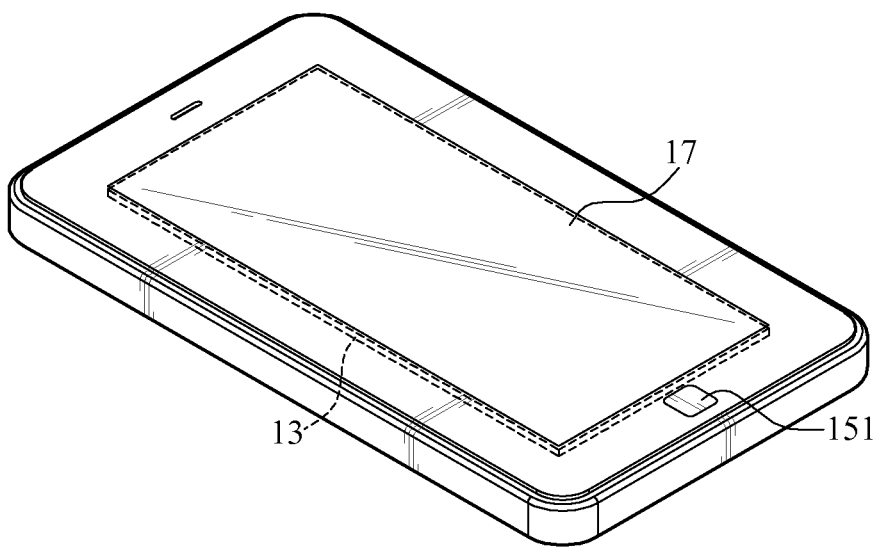
FIG. 1B is a schematic of the portable device according to one embodiment of this invention.

As to a portable device according to one embodiment of this invention, please refer to FIG. 1A and FIG. 1B, wherein FIG. 1A is a functional block diagram of the portable device according to one embodiment of this invention and FIG. 1B is a schematic of the same. As shown in FIG. 1A, a portable device 1 may comprise a processing module 11, a sensing module 13, an enabling control module 15, and a power module 16. The power module 16 is electrically coupled to the processing module 11 and the enabling control module 15. The enabling control module 15 is electrically coupled to the sensing module 13 and the processing module 11. The operation of each of the modules in the portable device 1 is respectively depicted as below.

The processing module 11 is configured to perform an operating system to drive the portable device 1 when the processing module 11 is enabled. In one embodiment, the processing module 11 may comprises a central processing unit 111, hereinafter as CPU 111, and a basic input/output system 113, hereinafter as BIOS 113. When the processing module 11 receives an operating system start-up signal, the processing module 11 reads the operating system from a non-transitory storage medium (not illustrated) and performs the operating system to drive the portable device 1. According to this embodiment, the CPU 111 in the processing module 11 may be, for example but not limited to, an application-specific integrated circuit (ASIC), an advanced RISC machine (ARM), a CPE, a mono-chip controller, or any other devices applicable for calculating and controlling.

The sensing module 13 is configured to sense a gesture to generate a set of touch sensing signals when being enabled and to generate an operating system start-up signal when the set of touch sensing signals conforms to a set of preset signals. In practice, the sensing module 13 may comprise a touch pad 131, composed of a plurality of sensing units, and a touch control unit 133, which may also called as touch controller, electrically coupled to the touch pad 131. A set of preset signals may be stored in the touch control unit 133. The set of preset signals is used for depicting a plurality of coordinates of a specific portrait and, even more, a sequence of the plurality of coordinates. When one sensing unit of the touch pad 131 is touched, the touch control unit 133 computes a coordinate corresponding to the touched sensing unit. As such, when a plurality of sensing units of the touch pad 131 is sequentially touched, the touch control unit 133 may so obtain a plurality of coordinates and the sequence of the same, correspondingly. Hence, a track corresponding to a gesture operated by a user on the touch pad 131 is then obtained. The touch control unit 133 then takes the track, comprising the plurality of coordinates and the sequence of the same, as a set of touch sensing signals and compares the set of touch sensing signals with the set of preset signals to determine whether they are conform to each other. According to this embodiment, the touch pad 131 can be, for example but not limited to, a capacitive touch pad, a resistive touch pad, an optical imaging touch pad, or any other devices applicable for sensing the gesture. The touch control unit 133 may be circuits with logic operation functionality.

When the touch control unit 133 determines that a plurality of coordinates, which may further includes the sequence of the same, of a set of touch sensing signals conforms to those of a set of preset signals, the touch control unit 133 may determine that the set of touch sensing signals conforms to the set of preset signals and generate an operating system start-up signal. In one embodiment, when the touch control unit 133 determines the set of touch sensing signals fails to conform to the set of preset signals, the touch control unit 133 may generate a disabling signal.

Figure 2A:
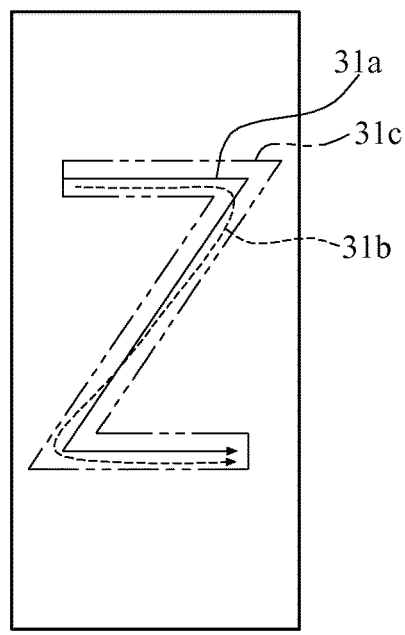
FIG. 2A is schematic of the set of touch sensing signals and the set of preset signals according to one embodiment of this invention.
Figure 2B:
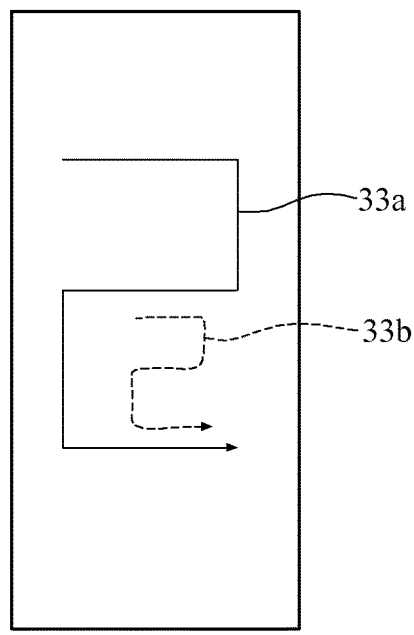
FIG. 2B is schematic of the set of touch sensing signals and the set of preset signals according to another embodiment of this invention.

As to the determination of whether the set of touch sensing signals conforms to the set of preset signals, please refer to FIG. 2A and FIG. 2B, wherein FIG. 2A and FIG. 2B are schematics of the set of touch sensing signals and the set of preset signals according to one embodiment of this invention. The touch control unit 133 may determine whether the set of touch sensing signals conforms to the set of preset signal with a heuristic algorithm.

Specifically, as shown in FIG. 2A, the track 31a is stored in the touch control unit 133. The track 31b is composed of a plurality of coordinates corresponding to a set of touch sensing signal sensed by the touch pad 131 when a user touches the screen of the portable device 1. The area 31c is a tolerable inputting area defined according to the track 31a. That is, even if the track 31b is not identical to the track 31a, the touch control unit 133 still determines that the track 31b conforms to the track 31a because the track 31b is within and suits the area 31c. In other words, the set of touch sensing signals is determined to conform to the set of preset signals stored in the touch control unit 133.

As shown in FIG. 2B, in another embodiment, the track 33a is stored in the touch control unit 133, and the track 33b is composed of a plurality of coordinates corresponding to a set of touch sensing signal sensed by the touch pad 131 when a user touches the screen of the portable device 1. Although the size of the track 33b is not equal to the size of the track 33a, the touch control unit 133 may scale up the track 33b and compared the scaled-up track corresponding to the track 33b with the track 33a according to the method depicted in FIG. 2A to determine whether the track 33b is similar to the track 33a. If the track 33b is determined to be similar to the track 33a, the touch control unit 133 determines the set of touch sensing signals conforms to the set of preset signals. In other words, the heuristic algorithm in this embodiment is an algorithm taking the position error and the size error into consideration and allowing certain error of inputting gesture.

The enabling control module 15 is configured to conduct a first power path between the power module 16 and the sensing module 13 according to a switching signal to enable the sensing module 13 and to conduct a second power path between the power module 16 and the processing module 11 to enable the processing module 11 when receiving the operating system start-up signal. In practice, only the enabling control module 15 consumes the electric power stored in the power module 16 when the portable device 1 is shut-down, which means every module except both of the power module 16 and the enabling control module 15 are released from the enabled state, or equivalently, both of the power module 16 and the enabling control module 15 are released from being enabled.

Referring to the connections and the interactivities between the units in the enabling control module 15, please refer back to FIG. 1A. The enabling control module 15 may comprise a button switching unit 151, an embedded control unit 153, hereinafter as ECU 153, a first power switching unit 155, and a second power switching unit 157. The first power switching unit 155 is electrically coupled between the sensing module 13 and the power module 16. The second power switching unit 157 is electrically coupled between the processing module 11 and the power module 16. The ECU 153 is respectively electrically coupled to the button switching unit 151, the first power switching unit 155, the second power switching unit 157, the power module 16, and the sensing module 13.

When the portable device 1 is shut-down, if the ECU 153 detects or receives a switching signal, the ECU 153 will generate a first enabling signal to enable the first power switching unit 155 so as to conduct a first power path between the power module 16 and the sensing module 13 to enable the sensing module 13. Then, the ECU 153 waits for the operating system start-up signal sent from the sensing module 13. When the ECU 153 receives the operating system start-up signal sent from the sensing module 13, the ECU 153 will generate a second enabling signal to enable the second power switching unit 157 so as to conduct a second power path between the power module 16 and the processing module 11 to enable the processing module 11. In one embodiment, the switching signal may be generated by the button switching unit 151 when the button switching unit 151 is pressed. In another embodiment, the switching signal may be automatically generated by the ECU 153 at a predetermined time point.

In one embodiment, when the portable device 1 is turned on, and the enabling control module 15 receives the switching signal, the enabling control module 15 will not perform as described above but will perform with predetermined function.

In one embodiment, ordinarily, the user is aware of his/her starting up the portable device 1, the user may touch the screen of the portable device 1 with a gesture after the button switching unit 151 is pressed and the portable device 1 is turned-on so that the touch pad 131 may sense a set of touch sensing signals and the touch control unit 133 may accordingly determine whether the set of touch sensing signals conforms to a set of preset signals.

In another embodiment, when the sensing module 13 is ready for sensing the gesture of the user, that is, the touch pad 131 and the touch control unit 133 are both enabled, the sensing module 13 sends a feedback signal to the ECU 153 in the enabling control module 15 so that the ECU 153 enables one or more backlight module (not illustrated). In yet another embodiment, the ECU 153 enables the backlight module and the sensing module at the same time.

For example, the backlight module may corresponds to the button switching unit 151 in the enabling control module 15, so when the sensing module 13 is ready for sensing the gesture, the button switching unit 151 is emitting light to inform the user. In another example, the backlight module may belong to the display module 17 so that when the sensing module 13 is ready for sensing the gesture, the user may find out that the display is not totally dark as being released from enabled and aware that he/she can begin to unlock the portable device 1 with the gesture.

The power module 16 is configured to provide electric power. In practice, when the portable device 1 is shut-down, only the ECU 153 in the enabling control module 15 consumes the electric power of the power module 16. When the ECU 153 detects the switching signal and temporarily enables the sensing module 13, each unit in the sensing module 13 and the ECU 153 only perform the basic logic operations and need neither high operation frequency nor high supply voltage. Hence, the power module 16 may supply power to the sensing module 13 and the enabling control module 15 with low voltage in such condition, that is, the power module 16 may supply power to the sensing module 13 and the enabling control module 15 with a standby voltage lower than normal operation voltage. On the contrary, when the ECU 153 determines to enable the processing module 11 to start-up the portable device 1 according to the operating system start-up signal, at least the processing module 11 needs the normal operating voltage to ensure the operation frequency. Hence, in one embodiment, the power module 16 may supply power to the processing module 11 with the normal operating voltage.

Figure 3A:
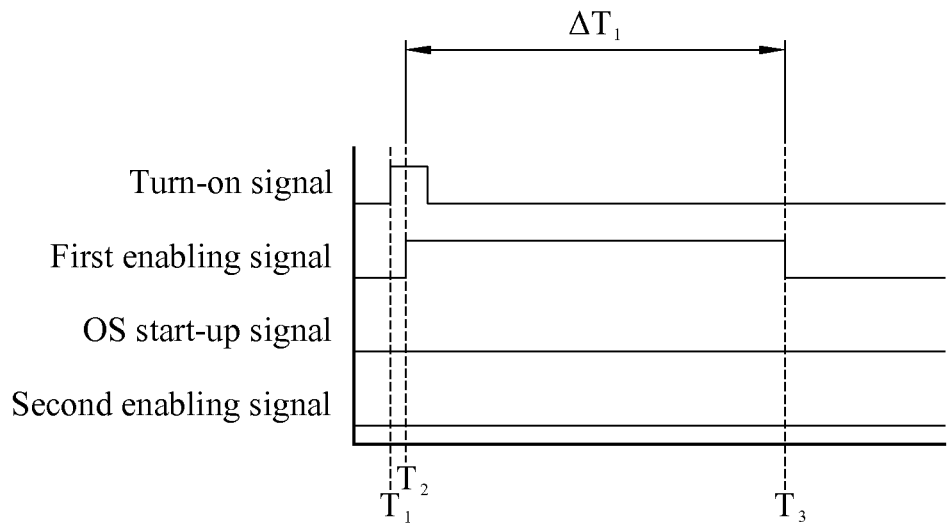
FIG. 3A is a timing diagram in one embodiment of this invention.

As to the interactions between the modules in one embodiment of this invention, please refer to FIG. 3A, which is a timing diagram in one embodiment of this invention. As shown in FIG. 3A, the button switching unit 151 is pressed unwillingly or the ECU 153 is set to start-up the portable device 1 at the first time point T1. As such, the logic level of a switching signal is varying (from low to high) at the first time point T1. When the ECU 153 detects the variation of the logic level of the switching signal, the ECU 153 then, at the second time point T2, varies the logic level of the first enabling signal from low to high so as to enable the first power switching unit 155 to conduct the first power path and to enable the sensing module 13. Then, the ECU 153 does not receive the operating system start-up signal within the first time interval ΔT1, from the second time point T2 to the third time point T3, so the ECU 153 varies the logic level of the first enabling signal from high to low so as to release the first power switching unit 155 from being enabled to break the first power path and to release the sensing module 13 from being enabled. In certain embodiments, the ECU 153 not necessarily lowers the logic level of the first enabling signal only at the third time point T3, but the ECU 153 may also lower logic level of the first enabling signal when receiving a disabling signal sent from the touch control unit 133.

Figure 3B:
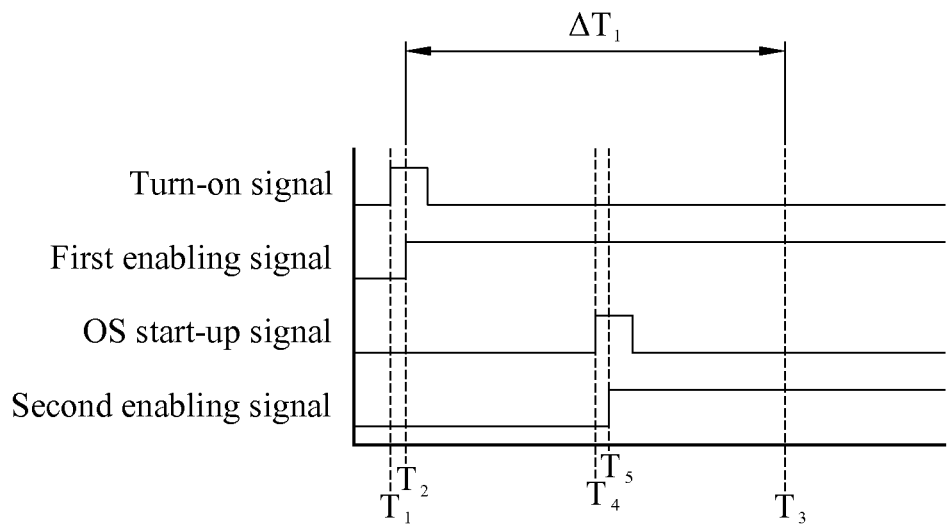
FIG. 3B is a timing diagram in another embodiment of this invention.

As to the interactions between the modules in another embodiment of this invention, please refer to FIG. 3B, which is a timing diagram in another embodiment of this invention. As shown in FIG. 3B, the button switching unit 151 is pressed by the user willingly or the ECU 153 is set to start-up the portable device 1 at the first time point T1, so the logic level of the switching signal varies from low to high at the first time point T1. When the ECU 153 detects the variation of the logic level of the switching signal, the ECU 153 then, at the second time point T2, varies the logic level of the first enabling signal from low to high so as to enable the first power switching unit 155 to conduct the first power path and to enable the sensing module 13. Then, at the fourth time point T4, the touch control unit 133 in the sensing module 13 determines that a set of touch sensing signals corresponding to the user's inputting gesture conforms to a set of preset signals, so the touch control unit 133 varies the logic level of the operating system start-up signal from low to high. When the ECU 153 detects such variation of the operating system start-up signal, the ECU 153 then varies the logic level of the second enabling signal from low to high at the fifth time point T5 so as to enable the second power switching unit 157 to conduct the second power path and to enable the processing module 11. In this case, the ECU 153 does not vary the logic level of the first enabling signal from high to low at the third time point T3.

In yet another embodiment, please refer back to FIG. 1A. The portable device 1 may further comprise a display module 17. The display module 17 is electrically coupled to the processing module 11 and the enabling control module 15 and is configured to display images when being enabled. In this embodiment, the ECU 153 in the enabling control module 15 temporarily generates a second enabling signal to temporarily enable the second power switching unit 157 after the ECU 153 detects or receives the switching signal. As such, the second power path between the power module 16, the processing module 11, and the display module 17 is temporarily conducted within the second time interval, and the processing module 11 and the display module 17 are temporarily enabled within the second time interval.

In addition, the ECU 153 in the enabling control module 15 may bypass the operating system start-up signal to the processing module 11. Hence, the processing module 11 may determine whether to temporarily control the display module 17 to display a prompt message or to perform the operating system to start-up the portable device 1. In practice, the prompt message may be stored in the BIOS 113 in the processing module. When the CPU 111 in the processing module 11 is enabled but not receiving the operating system start-up signal, the CPU 111 determines to read the prompt message and the driving program of the display module 17 from the BIOS 113 and to control the display module 17 to temporarily display the prompt message.

In this embodiment, the prompt message may be a sentence to inform the user to start unlocking and the time allowing the unlocking operation. The prompt message may also include static image comprising the unlocking portrait and be displayed for a short term such as couples of seconds so that the user is informed and the power is not consumed too much.

In another embodiment, the prompt message may be a dynamic image comprising the unlocking portrait and can vary with the set of touch sensing signals sensed by the sensing module 13 so that the user may know whether the inputting gesture is correct or not. Moreover, only if the inputting gesture fails to conform to the preset unlocking portrait, the CPU 111 controls the display module 17 to display what the user inputs. According to the aforementioned embodiment, the display module 17 may be, for example but not limited to, a liquid crystal display, a light emitting diode display, an active matrix organic light emitting diode display, or any other devices applicable for displaying images.

Figure 3C:
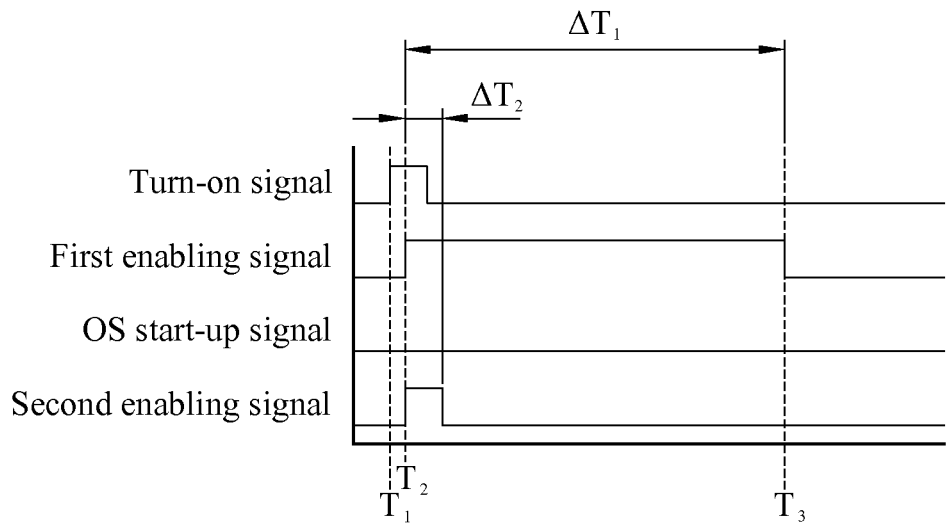
FIG. 3C is a timing diagram in one embodiment of this invention.

As to the interactions between the modules in one embodiment of this invention, please refer to FIG. 3C, which is a timing diagram in one embodiment of this invention. As shown in FIG. 3C, the button switching unit 151 is pressed unwillingly or the ECU 153 is set to start-up the portable device 1 at the first time point T1. As such, the logic level of a switching signal is varying (from low to high) at the first time point T1. When the ECU 153 detects the variation of the logic level of the switching signal, the ECU 153 then, at the second time point T2, varies the logic level of the first enabling signal and the logic level of the second enabling signal from low to high so as to enable the first power switching unit 155 and the second power switching unit 157 to conduct the first power path and the second power path so as to enable the processing module 11, the sensing module 13, and the display module 17. The processing module 11 does not receive the operating system start-up signal, so the CPU 111 in the processing module 11 may determine that the processing module 11 is temporarily enabled and read the prompt message and the driving program of the display module 17 from the BIOS 113 to control the display module 17 to display the prompt message.

Then, the ECU 153 varies the logic level of the second enabling signal from high to low to break the second power path to release both of the processing module 11 and the display module 17 from being enabled after a second time intervalvΔT2 since the second time point T2. The ECU 153 does not receive the operating system start-up signal within the first time interval ΔT1, from the second time point T2 to the third time point T3, so the ECU 153 varies the logic level of the first enabling signal from high to low so as to release the first power switching unit 155 from being enabled to break the first power path and to release the sensing module 13 from being enabled. In certain embodiments, the ECU 153 not necessarily lowers the logic level of the first enabling signal only at the third time point T3, but the ECU 153 may also lower logic level of the first enabling signal when receiving a disabling signal sent from the touch control unit 133.

Figure 3D:
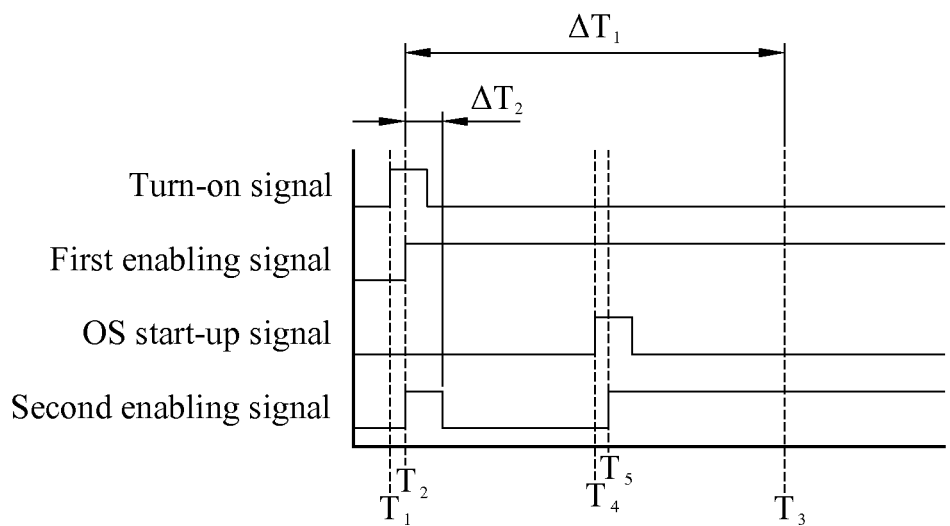
FIG. 3D is a timing diagram in another embodiment of this invention.

As to the interactions between the modules in another embodiment of this invention, please refer to FIG. 3D, which is a timing diagram in another embodiment of this invention. As shown in FIG. 3D, the button switching unit 151 is pressed by the user willingly or the ECU 153 is set to start-up the portable device 1 at the first time point T1, so the logic level of the switching signal varies from low to high at the first time point T1. When the ECU 153 detects the variation of the logic level of the switching signal, the ECU 153 then, at the second time point T2, varies the logic level of the first enabling signal and the second enabling signal from low to high so as to enable the first power switching unit 155 and the second power switching unit 157 to conduct the first power path and the second power path so as to enable the processing module 11, the sensing module 13, and the display module 17. The processing module 11 does not receive the operating system start-up signal, so the CPU 111 in the processing module 11 may determine that the processing module 11 is temporarily enabled and read the prompt message and the driving program of the display module 17 from the BIOS 113 to control the display module 17 to display the prompt message.

Then, the ECU 153 varies the logic level of the second enabling signal from high to low to break the second power path to release both of the processing module 11 and the display module 17 from being enabled after a second time interval ΔT2 since the second time point T2. At the fourth time point T4, the touch control unit 133 in the sensing module 13 determines that a set of touch sensing signals corresponding to the user's inputting gesture conforms to a set of preset signals, so the touch control unit 133 varies the logic level of the operating system start-up signal from low to high. When the ECU 153 detects such variation of the operating system start-up signal, the ECU 153 then varies the logic level of the second enabling signal from low to high at the fifth time point T5 so as to enable the second power switching unit 157 to conduct the second power path and to enable the processing module 11. In this case, the ECU 153 does not vary the logic level of the first enabling signal from high to low at the third time point T3.

Although it is the sensing module 13 to determine whether the set of touch sensing signals conforms to the set of preset signals so as to generate the operating system start-up signal, in another embodiment, the sensing module 13 may pass the set of touch sensing signals to the ECU 153. The aforementioned process of determining whether the set of touch sensing signals conforms to the set of preset signals to generate the operating system start-up signal is performed by the ECU 153.

Figure 4A:
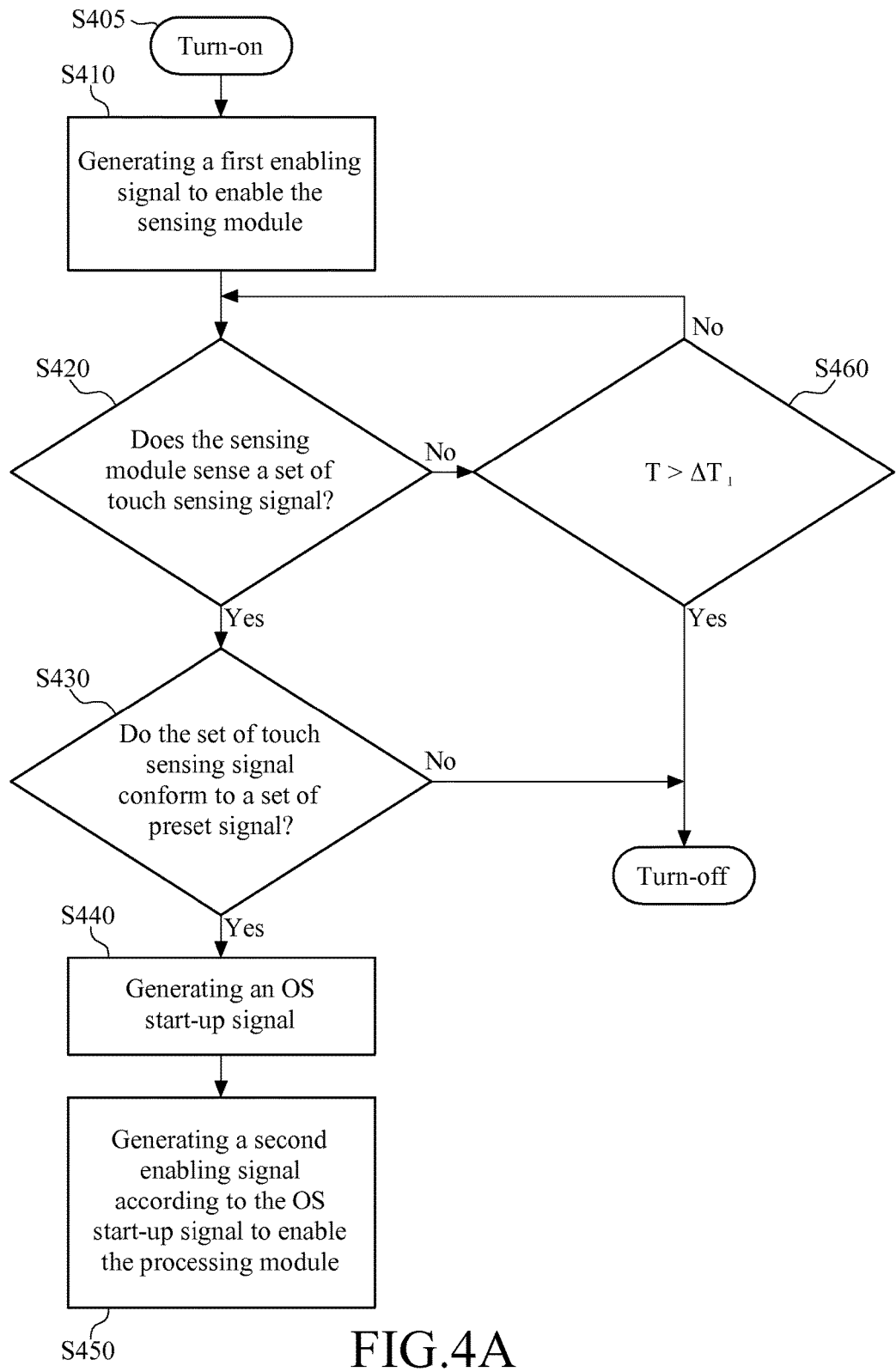
FIG. 4A is a flowchart of the method in one embodiment of this invention.

Please now refer to FIG. 1A and FIG. 4A for understanding a method for enabling a portable device according to one or more embodiment of this invention, wherein FIG. 4A is a flowchart of the method in one embodiment of this invention. As shown in step S405, the button switching unit 151 is pressed to generate the switching signal to turn-on the portable device 1. As shown in step S410, the enabling control module 15 generates the first enabling signal to enable the sensing module 13 according to the switching signal. As shown in step S420, the sensing module 13 determines whether a set of touch sensing signals is sensed. If the sensing module 13 senses the set of touch sensing signal, as shown in step S430, the sensing module in advance determines whether the set of touch sensing signals conforms to a set of preset signals. If the sensing module 13 determines the set of touch sensing signals conforms to the set of preset signals, as shown in step S440, the sensing module 13 generates an operating system start-up signal. As shown in step S450, the enabling control module 15 enables the processing module 11 according to the operating system start-up signal. In step S420, if the sensing module 13 does not sense the set of touch sensing signals, as shown in step S460, the sensing module 13 determines whether the time elapsed is greater than the first time interval ΔT1. If the time elapsed is less than the first time interval ΔT1, the flow goes back to step S420. Otherwise, the enabling control module 15 releases the sensing module 13 from being enabled to turn-off the portable device 1.

Figure 4B:
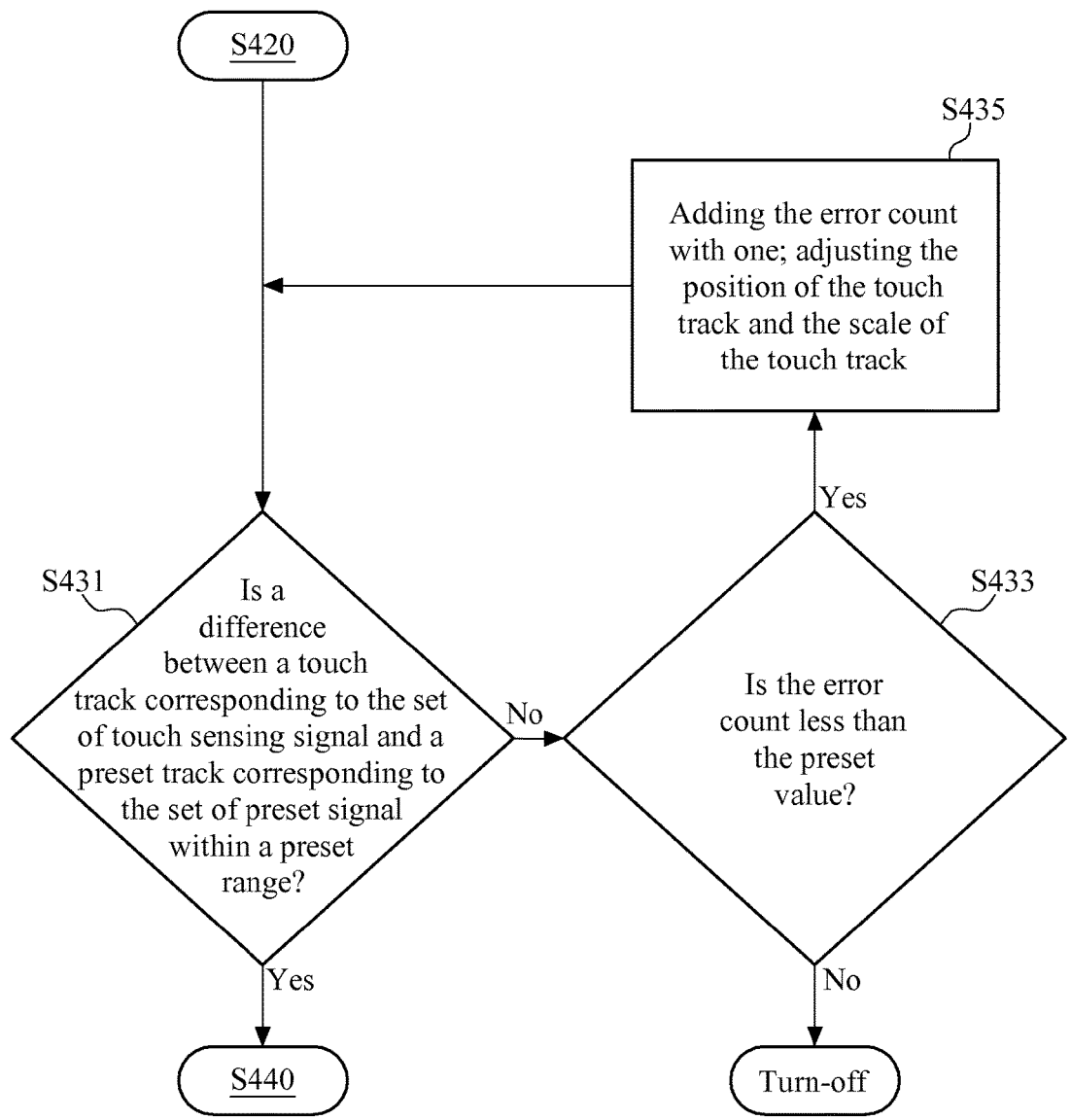
FIG. 4B is a flowchart of the step S430 in FIG. 4A in one embodiment of this invention.

In addition, please refer to FIG. 4B to understand the flow about how the sensing module 13 determines whether the set of touch sensing signals conforms to the set of preset signals in the step S430, wherein FIG. 4B is a flowchart of the step S430 in FIG. 4A in one embodiment of this invention. As shown in step S431, the touch control unit 133 determines whether a difference between a touch track corresponding to the set of touch sensing signals and a preset track corresponding to the set of preset signals is within a preset range. If the difference is within the preset range, the flow goes to the step S440. Otherwise, as shown in step S433, the touch control unit 133 in advance determines whether the error count, which indicates how many times the difference is not within the preset range, is less than a preset value such as five. If the error count is less than the preset value, as shown in step S435, the touch control unit 133 adds the error count with one and adjusts the position and scale of the touch track, and then the flow goes back to step S431. If the error count is greater than the preset value, the set of touch sensing signals is determined to not conform to the set of preset signals by the touch control unit 133.

Figure 5:
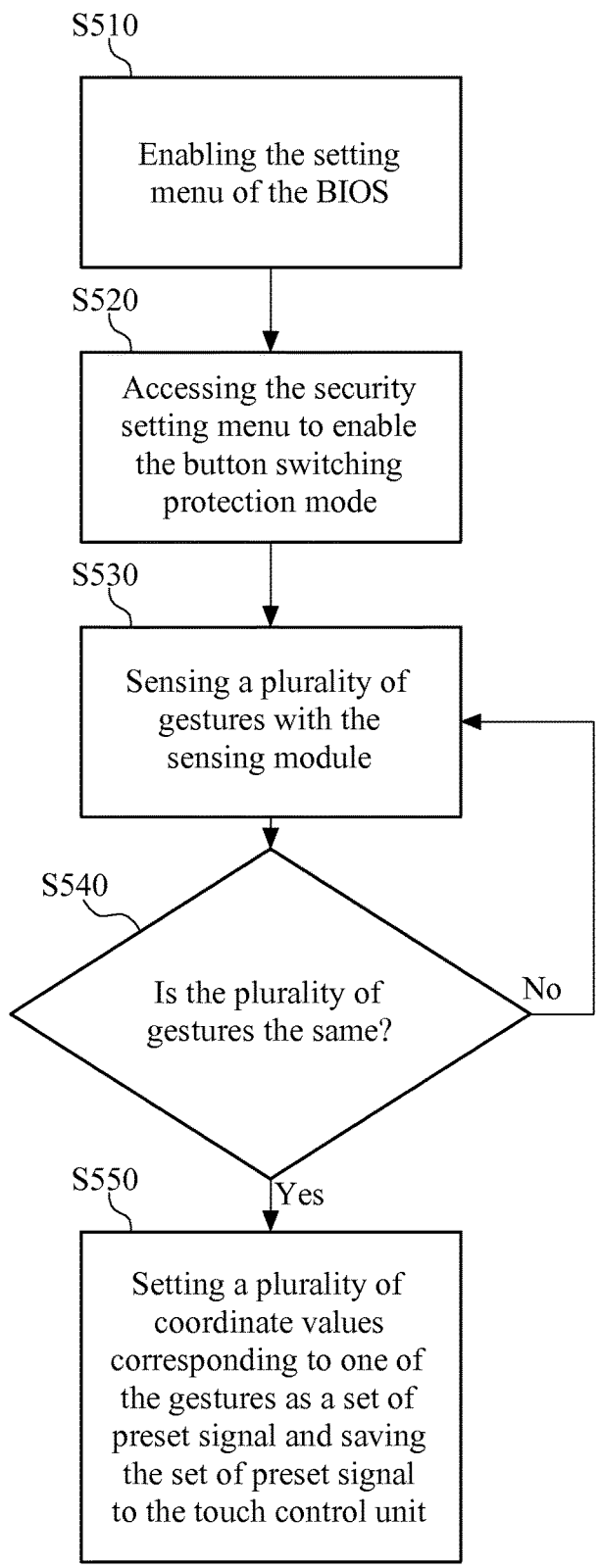
FIG. 5 is a flowchart of the method for setting the set of preset signals in one embodiment of this invention.

Please refer to FIG. 1A and FIG. 5 for understanding the method for setting the set of preset signals in one embodiment of this invention, wherein FIG. 5 is a flowchart of the method for setting the set of preset signals in one embodiment of this invention. As shown in step S510, the user may enable the setting menu of the BIOS 113 of the portable device 1. As shown in step S520, the user may then access the security setting menu to enable the button switching protection mode. As shown in step S530, the portable device 1 may display prompt messages on the display module 17 to require the user to input gestures for multiple times such as twice, three times, or four times. The touch pad 131 in the sensing module 13 is then sensing the input gestures. As shown in step S540, the touch control unit 133 may determines whether the gestures are the same. The determination may be performed with the aforementioned heuristic algorithm. If the gestures are not the same, the flow goes back to the step S530. Otherwise, as shown in step S550, the touch control unit 133 sets a plurality of coordinate values corresponding to one of the gestures as the set of preset signals and the touch control unit 133 also saves the set of preset signals. Additionally, the set of preset signals may be also saved in the BIOS 113 as the prompt message.

When a user uses a portable device provided in one or more embodiment of this invention, the portable device does not entirely turn-on in an unlocking phase. In the unlocking phase, the first time interval, the processing module, the display module, and/or the transmitting/receiving module consuming most of power may not be enabled or be enabled only for a while such as couples of seconds. As such, if the portable device is turn-on unwillingly, the consumed electric power of the provided portable device is relatively less than a conventional portable device.

As above, when the portable device according to this invention is to be turn-on, there may be only the sensing module enabled to sense the touch sensing signals. The sensing module generates an operating system start-up signal only when the touch sensing signals conform to preset signals. The processing module drives the portable device according to the operating system start-up signal. After a first time interval since the portable device's turn-on or when the touch sensing signals fail to conform to the preset signals, the sensing module is not enabled. As such, the consumed power when the portable device is unwillingly touched and turn-on may be reduced.

It will be apparent to those skilled in the art that various modifications and variations can be made to the disclosed embodiments. It is intended that the specification and examples be considered as exemplary only, with a true scope of the invention being indicated by the following claims and their equivalents.

What is claimed is:

1. A portable device, comprising:
   a power module, configured to provide electric power;
   a processing module, electrically coupled to the power module and configured to perform an operating system to drive the portable device when being enabled;
   a sensing module, configured to sense a gesture to generate a set of touch sensing signals when being enabled, wherein it is determined that the set of touch sensing signals corresponds to a set of preset signals and the sensing module generates an operating system start-up signal when a difference between a first scaled track corresponding to the set of touch sensing signals and a second track corresponding to the set of preset signals is within a preset range;
   based on a determination that the difference between the first scaled track and the second track is not within the preset range, determining whether an error count is less than a preset value, the error count indicating a number of times the difference between the first scaled track and the second track is within the preset range, and based on a determination that the error count is less than the preset value, adjusting a position and scale of the first scaled track; and
   an enabling control module, electrically coupled to the sensing module, the power module, and the processing module, configured to set a first power path between the power module and the sensing module according to a switching signal to conduct electricity to enable the sensing module and to set a second power path between the power module and the processing module to conduct electricity to enable the processing module when receiving the operating system start-up signal;
   wherein when the first power path is set to conduct electricity to enable the sensing module and the set of touch sensing signals does not correspond to the set of preset signals, the second power path is not set to conduct electricity.

2. The portable device according to claim 1, wherein the enabling control module comprises:
   a button switching unit;
   a first power switching unit, electrically coupled between the sensing module and the power module, controlled by a first enabling signal to set the first power path between the sensing module and the power module to conduct electricity;

a second power switching unit, electrically coupled between the processing module and the power module, controlled by a second enabling signal to set the second power path between the processing module and the power module to conduct electricity; and an embedded control unit, electrically coupled to the button switching unit, the first power switching unit, the second power switching unit, the power module, and the sensing module, configured to generate the first enabling signal by determining whether the button switching unit is pressed and to generate the second enabling signal according to the operating system start-up signal.

3. The portable device according to claim 1, wherein the enabling control module releases the sensing module from being enabled if the operating system start-up signal is not received by the enabling control module within a first time interval after the sensing module is enabled.

4. The portable device according to claim 1, wherein the sensing module sends a disabling signal when the set of touch sensing signals does not correspond to the set of preset signals, and the enabling control module releases the sensing module from being enabled according to the disabling signal.

5. The portable device according to claim 1, further comprising:

a display module, electrically coupled to the processing module and the enabling control module, configured to display images when being enabled;

wherein the enabling control module temporarily set the second power path within a second time interval according to the switching signal to conduct electricity to enable the processing module and the display module within the second time interval, and the processing module controls the display module to display a prompt message within the second time interval.

6. The portable device according to claim 5, wherein the processing module comprises:

a basic input/output system (BIOS), configured to store the prompt message and a driving program corresponding to the display module; and a central processing unit (CPU), electrically coupled to the BIOS, the power module, the enabling control module, and the display module, configured to be temporarily enabled within the second time interval to get the prompt message and the driving program from the BIOS to drive the display module to display the prompt message.

7. The portable device according to claim 6, wherein the prompt message comprises at least one unlocking portrait.

8. The portable device according to claim 7, wherein the sensing module further sends the set of touch sensing signals to the CPU, and the CPU drives the display module to display the set of touch sensing signals.

9. The portable device according to claim 1, wherein the enabling control module determines whether the set of touch sensing signals corresponds to the set of preset signals with a heuristic algorithm.

10. A method for enabling a portable device, the method comprising:

generating a first enabling signal according to a switching signal to set a first power path between a power module and a sensing module to conduct electricity to enable the sensing module;

sensing a gesture by the sensing module to obtain a set of touch sensing signals corresponding to the gesture;

generating an operating system start-up signal by determining whether the set of touch sensing signals conforms to a set of preset signals; and generating an operating system start-up signal by determining whether the set of touch sensing signals conforms to a set of preset signals, wherein it is determined that the set of touch sensing signals conforms to a set of preset signals when a difference between a first scaled track corresponding to the set of touch sensing signals and a second track corresponding to the set of preset signals is within a preset range;

based on a determination that the difference between the first scaled track and the second track is not within the preset range, determining whether an error count is less than a preset value, the error count indicating a number of times the difference between the first scaled track and the second track is within the preset range, and based on a determination that the error count is less than the preset value, adjusting a position and scale of the first scaled track; and wherein when the first power path is set to conduct electricity to enable the sensing module and the set of touch sensing signals does not correspond to the set of preset signals, the second power path is not set to conduct electricity.

11. The method according to claim 10, further comprising:

determining whether the operating system start-up signal is received within a first time interval after the first enabling signal is generated; and adjusting the first enabling signal to release the sensing module from being enabled if the operating system start-up signal is not received within the first time interval.

12. The method according to claim 10, further comprising generating a disabling signal to adjust the first enabling signal to release the sensing module from being enabled if the set of touch sensing signals does not correspond to the set of preset signals.

13. The method according to claim 10, further comprising, within a second time interval, enabling a processing module to generating a prompt message and to drive a display module to display the prompt message.

14. The method according to claim 13, wherein the prompt message comprises at least one unlocking portrait.

15. The method according to claim 13, further comprising displaying the set of touch sensing signals by the display module.

16. The method according to claim 10, wherein whether the set of touch sensing signals corresponds to the set of preset signals is determined with a heuristic algorithm.

17. The method according to claim 10, further comprising performing a preset signal setting procedure to set the set of preset signals, wherein the preset signal setting procedure comprises:

sensing a plurality of setting gestures with the sensing module;

determining whether the setting gestures are identical;

setting the set of preset signals according to a plurality of coordinates corresponding to one of the setting gestures when the setting gestures are identical; and storing the set of preset signals in the sensing module.

18. A portable device, comprising:

a power module, configured to provide electric power;

a processing module, electrically coupled to the power
module, configured to perform an operating system to
drive the portable device when being enabled;
a sensing module, configured to sense a gesture to generate a set of touch sensing signals when being enabled; and
an enabling control module, electrically coupled to the sensing module, the power module, and the processing module, configured to:
set a first power path between the power module and the sensing module according to a switching signal to conduct electricity to enable the sensing module,
determine whether the set of touch sensing signals corresponds to a set of preset signals so as to correspondingly generate an operating system start-up signal;
based on a determination that the difference between the first scaled track and the second track is not within the preset range, determine whether an error count is less than a preset value, the error count indicating a number of times the difference between the first scaled track and the second track is within the preset range;
based on a determination that the error count is less than the preset value, adjust a position and scale of the first scaled track;
and set a second power path between the power module and the processing module according to the operating system start-up signal to conduct electricity to enable the processing module to perform the operating system,
wherein the operating system start-up signal is generated when a difference between a first scaled track corresponding to the set of touch sensing signals and a second track corresponding to the set of preset signals is within a preset range, and when the first power path is set to conduct electricity to enable the sensing module and the set of touch sensing signals does not correspond to the set of preset signals, the second power path is not set to conduct electricity.

19. The portable device according to claim 18, wherein the enabling control module comprises:
a button switching unit;
a first power switching unit, electrically coupled between the sensing module and the power module, controlled by a first enabling signal to set the first power path between the sensing module and the power module to conduct electricity;
a second power switching unit, electrically coupled between the processing module and the power module, controlled by a second enabling signal to set the second power path between the processing module and the power module to conduct electricity; and
an embedded control unit, electrically coupled to the button switching unit, the first power switching unit, the second power switching unit, the power module, and the sensing module, configured to generate the first enabling signal by determining whether the button switching unit is pressed, to determine whether the set of touch sensing signals corresponds to a set of preset signals so as to correspondingly generate the operating system start-up signal, and to generate the second enabling signal according to the operating system start-up signal.

20. The portable device according to claim 18, wherein the enabling control module releases the sensing module from being enabled if the operating system start-up signal is not received by the enabling control module within a first time interval after the sensing module is enabled.

21. The portable device according to claim 18, wherein the sensing module sends a disabling signal when the set of touch sensing signals does not correspond to the set of preset signals, and the enabling control module releases the sensing module from being enabled according to the disabling signal.

22. The portable device according to claim 18, further comprising:
a display module, electrically coupled to the processing module and the enabling control module, configured to display images when being enabled;
wherein the enabling control module temporarily set the second power path within a second time interval according to the switching signal to conduct electricity to enable the processing module and the display module within the second time interval, and the processing module controls the display module to display a prompt message within the second time interval.

23. The portable device according to claim 22, wherein the processing module comprises:
a basic input/output system (BIOS), configured to store the prompt message and a driving program corresponding to the display module; and
a central processing unit (CPU), electrically coupled to the BIOS, the power module, the enabling control module, and the display module, configured to be temporarily enabled within the second time interval to get the prompt message and the driving program from the BIOS to drive the display module to display the prompt message.

24. The portable device according to claim 23, wherein the prompt message comprises at least one unlocking portrait.

25. The portable device according to claim 24, wherein the sensing module further sends the set of touch sensing signals to the CPU, and the CPU drives the display module to display the set of touch sensing signals.

26. The portable device according to claim 18, wherein the enabling control module determines whether the set of touch sensing signals corresponds to the set of preset signals with a heuristic algorithm.

* * * * *